United States Patent
Ma et al.

(10) Patent No.: US 6,909,805 B2
(45) Date of Patent: Jun. 21, 2005

(54) DETECTING AND UTILIZING ADD-ON INFORMATION FROM A SCANNED DOCUMENT IMAGE

(75) Inventors: Yue Ma, West Windsor, NJ (US); Jinhong Katherine Guo, West Windsor, NJ (US)

(73) Assignee: Matsushita Electric Industrial Co., Ltd., Osaka (JP)

(*) Notice: Subject to any disclaimer, the term of this patent is extended or adjusted under 35 U.S.C. 154(b) by 757 days.

(21) Appl. No.: 09/773,213

(22) Filed: Jan. 31, 2001

(65) Prior Publication Data

US 2002/0102022 A1 Aug. 1, 2002

(51) Int. Cl.[7] .............................................. G06K 9/46
(52) U.S. Cl. ...................... 382/170; 382/171; 382/174; 382/180; 382/186; 382/229; 382/305; 715/511
(58) Field of Search ................................. 382/170, 171, 382/174, 168, 175, 176, 180, 186, 229, 173, 305, 306, 321; 715/512, 541, 507, 511; 358/462

(56) References Cited

U.S. PATENT DOCUMENTS

| | | | | |
|---|---|---|---|---|
| 4,949,392 A | * | 8/1990 | Barski et al. ................ | 382/283 |
| 5,063,600 A | * | 11/1991 | Norwood .................... | 382/186 |
| 5,119,433 A | * | 6/1992 | Will ............................ | 382/138 |
| 5,159,667 A | * | 10/1992 | Borrey et al. ............... | 715/500 |
| 5,237,628 A | * | 8/1993 | Levitan ....................... | 382/175 |
| 5,243,149 A | * | 9/1993 | Comerford et al. ......... | 178/18.03 |
| 5,581,682 A | * | 12/1996 | Anderson et al. ........... | 715/530 |
| 5,668,897 A | * | 9/1997 | Stolfo ......................... | 382/283 |
| 5,694,494 A | * | 12/1997 | Hart et al. ................... | 382/305 |
| 5,897,648 A | * | 4/1999 | Henderson .................. | 715/530 |
| 6,178,431 B1 | * | 1/2001 | Douglas ...................... | 715/512 |
| 6,301,386 B1 | * | 10/2001 | Zhu et al. .................... | 382/176 |
| 6,643,401 B1 | * | 11/2003 | Kashioka et al. ........... | 382/197 |
| 6,721,921 B1 | * | 4/2004 | Altman ....................... | 715/512 |

OTHER PUBLICATIONS

Najoua et al, A robust approach for Arabic printed character segmentation, Proceedings of the Third International Conference on Decoument Analysis and Recognition, Aug. 14–16, 1995, vol. 2, p 865–868.*

Srihari et al, A System to Read Names and Addresses on Tax Forms, Proceedings of the IEEE, Jul. 1996, vol. 84, iss 7, p 1038–1049.*

* cited by examiner

*Primary Examiner*—Von J. Couso
*Assistant Examiner*—Christopher Sukhaphadhana
(74) *Attorney, Agent, or Firm*—Harness, Dickey & Pierce, PLC

(57) ABSTRACT

A scanned document image, including add-on information such as handwritten annotations in addition to printed text lines, is processed by a handwriting detection method. First, at least one projection histogram is generated from the scanned document image. A regular pattern that correlates to the printed text lines is determined from the projection histogram. Second, connected component analysis is applied to the scanned document image to generate at least one merged text line. Each merged text line relates to at least one of the handwritten annotation and the printed text line. By comparing the merged text lines to the regular pattern of the projection histograms, the printed text lines are discriminated from the handwritten annotations.

17 Claims, 11 Drawing Sheets

DETECTING AND UTILIZING ADD-ON INFORMATION FROM A SCANNED DOCUMENT IMAGE

BACKGROUND OF THE INVENTION

1. Field of the Invention

This invention relates generally to information processing. More particularly, the invention relates to methods for discriminating add-on information from a scanned document image having the add-on information and original text.

2. Discussion

With the fast growth of computer-based systems in the past few decades, office workers now commonly use computerized word processing and office business systems to produce, edit and revise documents of all varieties, including printed text documents, spreadsheets, business presentations and the like. While these computerized systems include powerful document editing tools, there are times when it is more expedient to edit or annotate printed documents by simply writing revisions above the text or in the margins of a printed copy of the document. Sometimes, for example, the person making edits or annotations may not have access to an electronic copy of the document and may therefore be unable to use computerized document editing tools.

Moreover, there are also times when the person editing or annotating a printed document may make handwritten changes or additions to the document and then later need to have a copy of the document in its original, unedited and annotated form. Unless an extra copy of the document was previously saved, in its original form. Anyone who has ever tried to reconstitute a heavily edited document by manually erasing or covering up the edits and annotations understands how tedious and time consuming the process is. Automated methods of separating handwritten annotations from printed text, if developed, could potentially relieve much of the tedium.

The document reconstitution issue aside, hand-drawn annotations present other processing challenges, namely, how to identify and use the hand-drawn annotation to code a document for storage and retrieval in a computerized database. It would be quite useful, for example, if scanned images of paper documents could be categorized, stored and retrieved based on handwritten designations placed on the document prior to scanning. That would allow the user to quickly code a document by hand, leaving the imaging system with the task of identifying and reading the coded instructions and storing the document appropriately.

In general, detecting and using add-on information from a scanned document image can be very important because once add-on contents of the document are obtained, they may exhibit richer information than a static scanned document image. First, the printed text and possibly graphics reflect the originality of the document while the add-on contents such as handwritten annotations, stamps etc. reflect the alteration that has been done to the original document. Second, being able to differentiate the post-alternation done to the document can be beneficial to a document management system in several ways. For examples, the separation of the post-alteration may restore contents of add-on information via OCR/ICR or other pattern recognition/matching techniques. The history of a document may be recorded by restoring the original content from a document containing the post-alteration. Additionally, secure transmissions of original document content without leaking add-on information, and efficient compression and storage scheme may also be achieved. In the case where the original document is already stored in the database, the copy with add-on information need not be stored entirely in the database, whereas only add-on information needs to be stored.

Several attempts have been made address the need to separate handwritten annotations from printed text. One of them is a method for compressing images of bank checks that separates the handwritten annotations from the static check form. Such a method entirely depends on a document identifier such as a magnetic ink character recognition (MICR) line in order to separate the handwritten text from the static check form. However, the requirement of the document identifier limits such attempts to very specialized fields such as x-rays and NMR images, thereby increasing the cost and reducing the availability.

Other limited applications appear in the field of form processing. For example, in the form processing, handwritten entries on a form can be extracted using the standard template. This instant method is useful in processing large amounts of the forms having the same format such as magazine subscription forms, account forms, etc. However, the template has to be replaced when different types of documents are to be processed because the template can only handle a limited number of the different types of the documents. In reality, a document management system needs to handle various types of documents such as business letters or forms, images, fax documents, etc. Thus, the form processing method has limited use, and may be very time consuming and ineffective.

While the above described information processing methods have proven to be effective for their intended use, it is required that a new automatic separation technique that truly benefits from the add-on information separation be developed. Additionally, it would be highly desirable if the new method is not limited to specific field/formats, yet provides highly efficient separation of the add-on information from the original text.

SUMMARY OF THE INVENTION

The present invention addresses the aforementioned need by providing a method of detecting handwritten annotations from a scanned document image having a handwritten annotation and at least one printed text line.

First, at least one projection histogram is generated from the scanned document image. A regular pattern that correlates to the printed text lines is determined from the projection histogram. Second, connected component analysis is applied to the scanned document image to generate at least one merged text line. The connected component analysis generates connected components by connecting dark pixels that are in association with the others on the scanned document image. Bounding boxes are then generated to encapsulate all of the associated connected components. Line merging is performed over the scanned image to merge the bounding boxes that are within a same text line to generate at least one line merged text line. Each merged text line correlates to at least one of the handwritten annotations and the printed text lines. By comparing the merged text lines to the regular pattern of the projection histograms, the printed text lines are discriminated from the handwritten annotations.

For a more complete understanding of the invention, its objects and advantages, reference may be made to the following specification and to the accompanying drawings.

DETAILED DESCRIPTION THE PREFERRED EMBODIMENTS

Figure 1:
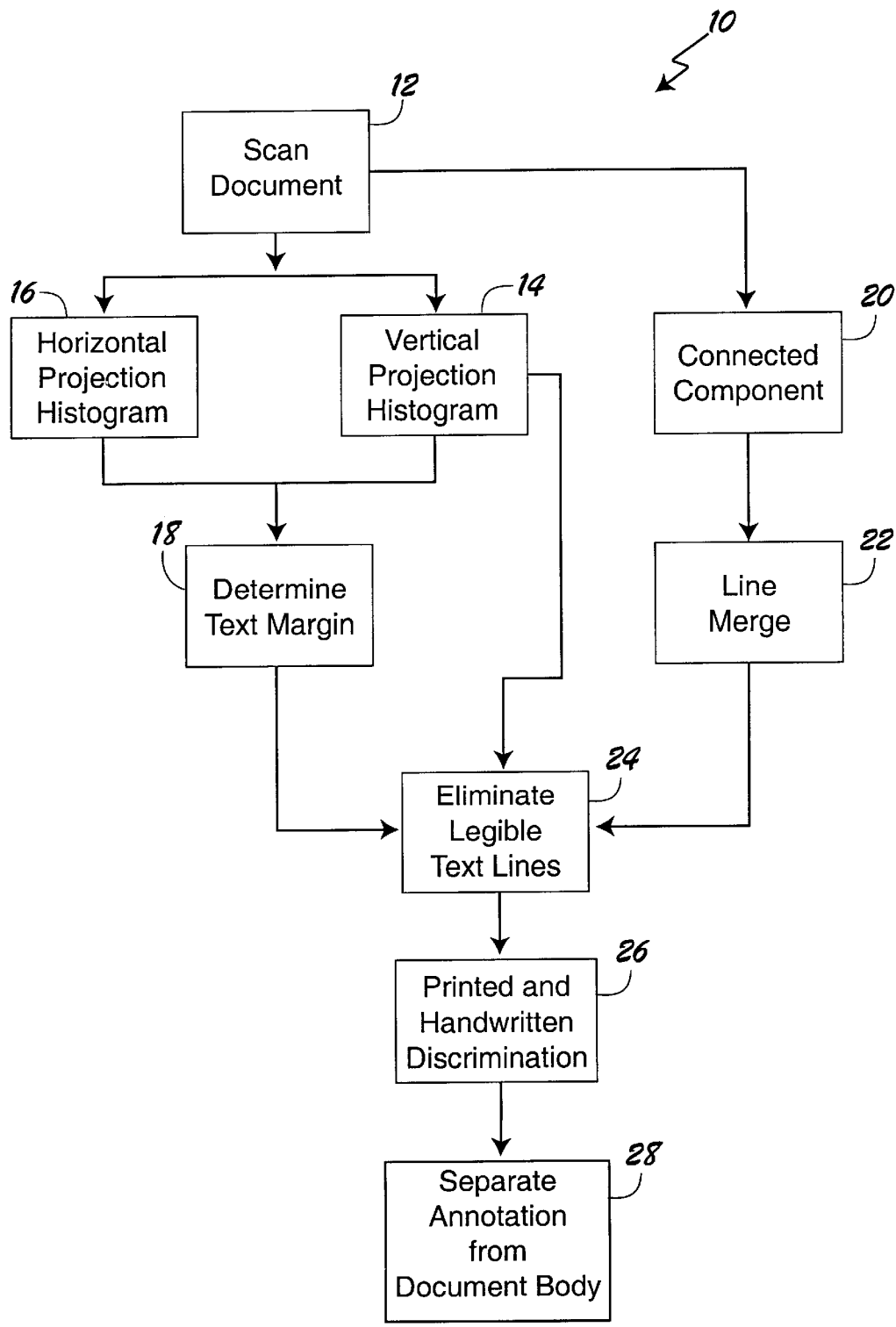
FIG. 1 is a flow chart depicting the method for detecting and separating handwritten annotations from a scanned document image according to the present invention.

Referring to FIG. 1 of the drawings, a method 10 for detecting and separating add-on handwritten annotations from a scanned document image is presented in accordance with the teachings of the present invention. The present invention is applicable to any scanned document image, including images comprising a handwritten annotation and at least one printed text line. The presently preferred method is performed as follows. First, at least one projection histogram for the scanned document image is generated, steps 14 and 16. Typically, a regular pattern that correlates to the printed text lines maybe derived from the projection histogram, step 18. Second, connected component analysis is performed over the scanned document image, to generate at least one merged text line, steps 20 and 22. Each merged text line relates to at least one of the handwritten annotations and the printed text line. By comparing the merged text lines to the regular pattern of the projection histograms, the printed text lines are discriminated from the handwritten annotations, steps 24–28.

More specifically, a document containing the printed text lines and the handwritten annotations on or near the margin area is scanned, step 12. Vertical and horizontal projection histograms are generated from the scanned document image, steps 14 and 16. Based on these histograms, the printed text margins are determined, step 18. At step 20, the connected component analysis is performed over the scanned document image to generate bounding boxes. At step 22, line merge is performed on the bounding boxes of the connected components to generate at least one merged line. The legible text lines are eliminated at step 24 based on the text margins and the merged lines determined at steps 20 and 22, respectively. After step 24, most of the printed text lines are separated from the handwritten annotations except for a few of the small connected components or the bounding boxes. A further discrimination between the printed text lines and the handwritten annotations is performed at step 26 for detecting the remaining text lines which have small bounding boxes that are not correlated with the text margins. The handwritten annotations detected at step 26 are also separated from the scanned document image at step 28.

Figure 2:
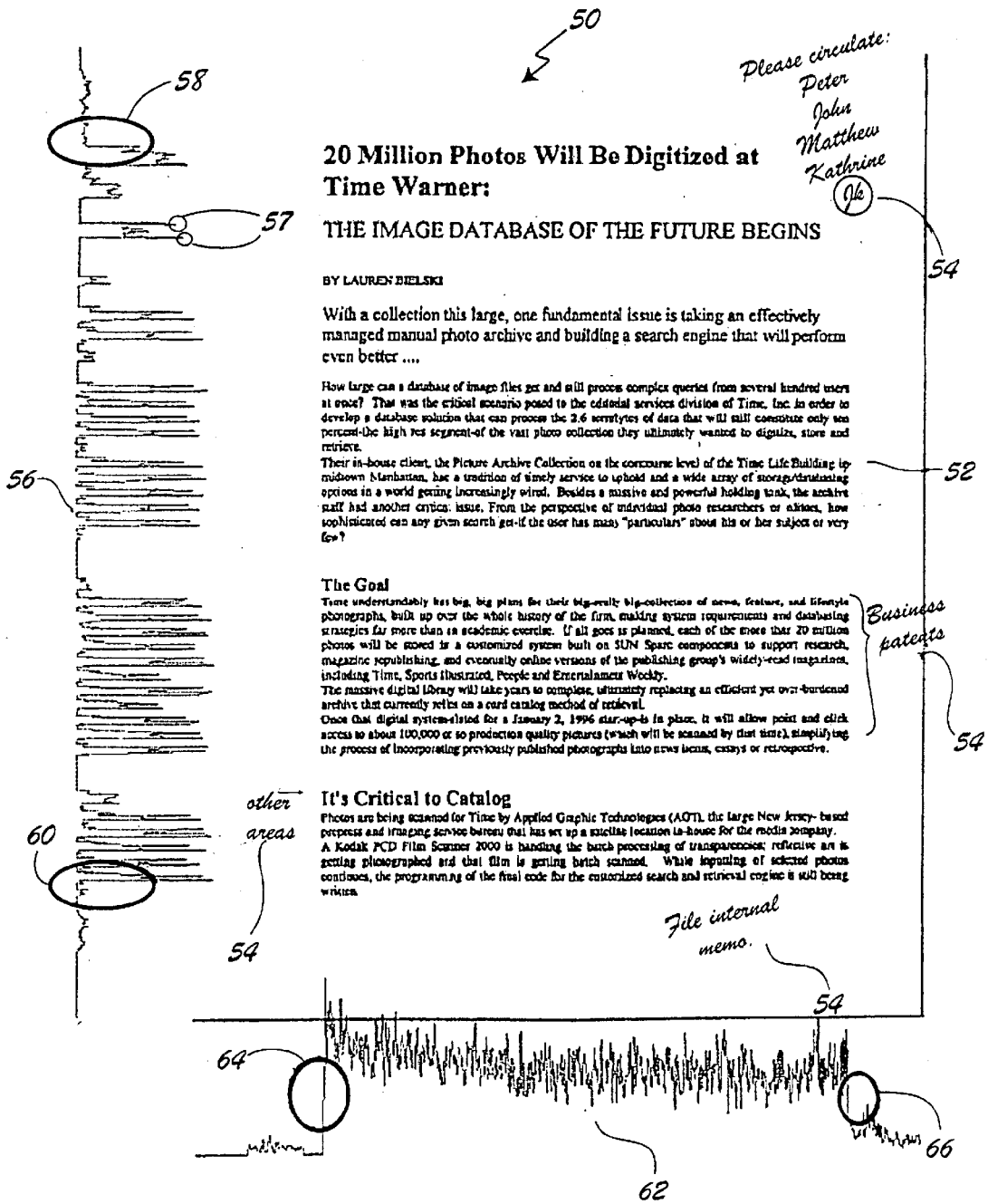
FIG. 2 is a sample of a scanned document image having printed text lines and handwritten annotations, with vertical and horizontal projection histograms placed onto the scanned document image.

Referring to FIG. 2 of the drawings, the projection histograms generated at steps 14 and 16 (FIG. 1) are illustrated in accordance with the present invention. The vertical and horizontal projection histograms 56 and 62, respectively, are generated from a scanned document image 50 having the printed text lines 52 and the handwritten annotations 54. The first sharp climb 58 and 64 or the last sharp drop 60 and 66 in the projection histograms 56 and 62 may indicate the margins of the scanned document image 50. More specifically, the first sharp climb 58, 64 indicates the largest jump in the threshold of the projection histograms 56 and 62 and represents the transition from the margin to the printed text lines 52. Likewise, the last sharp drop 60, 66 indicates the largest fall in the threshold of the projection histograms 56 and 62 and represents the transition from the printed text lines 52 to the margin, or the white space.

As is best illustrated in FIG. 2, the printed text lines 52 are usually aligned horizontally within the margins of English documents. On the contrary, the handwritten annotations 54 appear to be anywhere on the available white space of the scanned document image 50, and more frequently, beyond text margins. It should be understood that the types of documents are not limited to English documents. Any document having a regular pattern, for example, Chinese and Japanese documents having printed text lines that are aligned vertically within the margins of the document and the handwritten annotations on the available white space may also be used.

The vertical and horizontal projection histograms 56 and 62 illustrate the regularities of the text placement within the document image 50. From the horizontal projection histogram 62, left and right margins, or white spaces, are determined by detecting the first sharp climb 64 and the last sharp drop 66. From the vertical projection histogram 56, the top and bottom margins are determined by the first sharp climb 58 and the last sharp drop 60. Additionally, the vertical projection histogram 56 illustrates regularly patterned intensity levels for each of the printed text lines. Each of the printed text lines contain two peak intensity levels 57 which correspond to the top and bottom positions of each of the printed text lines. Although the handwritten annotations 54, written on the margin of the document may cause ripples in the projection histograms 56 and 62, the margins can still be detected without effect.

Figure 3A:
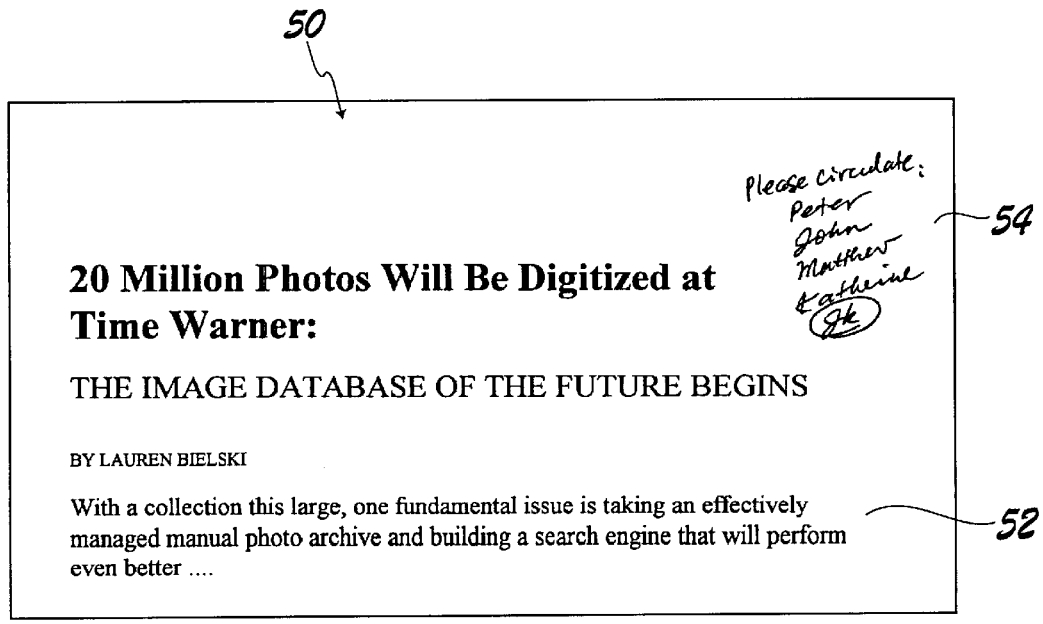
FIGS. 3A-B show an example of how connected component analysis is performed (FIG. 3B) over the scanned document image (FIG. 3A)
Figure 3B:
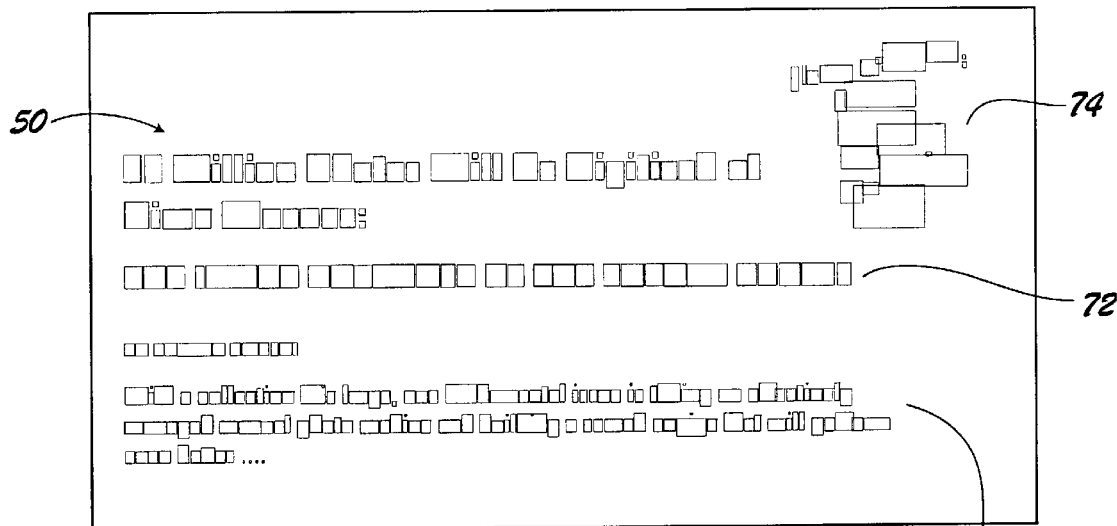

Referring to FIGS. 3A-B of the drawings, connected component analysis is performed on the scanned document image 50. FIG. 3A shows an upper portion of the scanned document image 50 containing the printed text lines 52 and the handwritten annotation 54. In the present invention, a fast run-length based algorithm is preferred in generating connected components. The run-length based algorithm detects for a consecutive row of dark pixels and their connectivity with its neighboring pixels in order to find pixels in association. A more detailed description of the faster run-length based algorithm is disclosed in U.S. patent Ser. No. 09/773,214, filed Jan. 31, 2001, entitled "Run-length Based Connected Components and Contour Following for Enhancing the performance of Circled Region Extraction Algorithm", which is assigned to the same assignee as the present invention. However, it should be understood that another method for performing connected component analysis may also be used.

As is best illustrated in FIG. 3B, the bounding boxes of both the printed text line 72 and the handwritten annotations 74 are generated upon completing the connected component analysis onto the scanned document image 50. Each of the bounding boxes 72 and 74 are constructed for merging the connection components that are in association. The appropriate size of each box is selected so that all dark pixels that are in consideration reside within the bounding box. After the connected component analysis, a line merge step 22 (FIG. 1) is performed on the bounding boxes 72 and 74 of the connected components to merge together individual text characters within the same line as shown in FIGS. 4A-B.

Figure 4A:
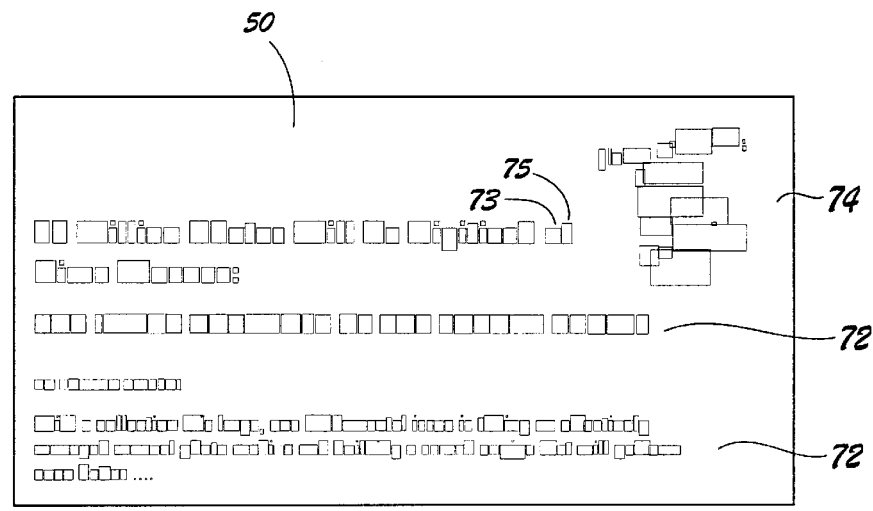
FIGS. 4A-B show an example of how line merge is performed (FIG. 4B) on the bounding boxes of the connected components (FIG. 4A) in the scanned document image of FIG. 2.

FIG. 4A illustrates the upper portion of the scanned document image 50 over which the connected components analysis has been performed. Each of the printed text lines and the handwritten annotations is encapsulated by the bounding boxes 72 and 74. The bounding boxes of the printed text lines 72 correspond to a more regular pattern. They have similar height and similar top positions for example. On the contrary, the bounding boxes of the handwritten annotations 74 are less regularly patterned. The handwritten annotation bounding boxes 74 vary in sizes and height from the others.

The line merge step 22 arbitrarily chooses two bounding boxes 73, 75 be line merged, for example, any two from the printed text line bounding boxes 72, two from the handwritten bounding boxes, 74, or one from the printed text line bounding box 72 and the other one from the handwritten bounding box 74 may arbitrarily be selected. The algorithm used in the line merge step 22 considers the top positions of any two arbitrary bounding boxes, their box height, and their horizontal distance from each other. If one of the two selected bounding boxes 73, 75 is completely inside the other bounding box, the two selected bounding boxes 73, 75 will be merged. Also, if two selected bounding boxes 73, 75 are neighbors and are on the same line, the two selected bounding boxes will be merged. In other words, the two bounding boxes will be merged if the horizontal distance between the two selected bounding boxes is below a predetermined threshold, measured from the top positions, and if the heights of the two selected bounding boxes 73, 75 are similar. The line merge process is performed recursively until no more line merging can be done. This is done because two merged bounding boxes may be qualified to merge with a third bounding box 72, 74.

Figure 4B:
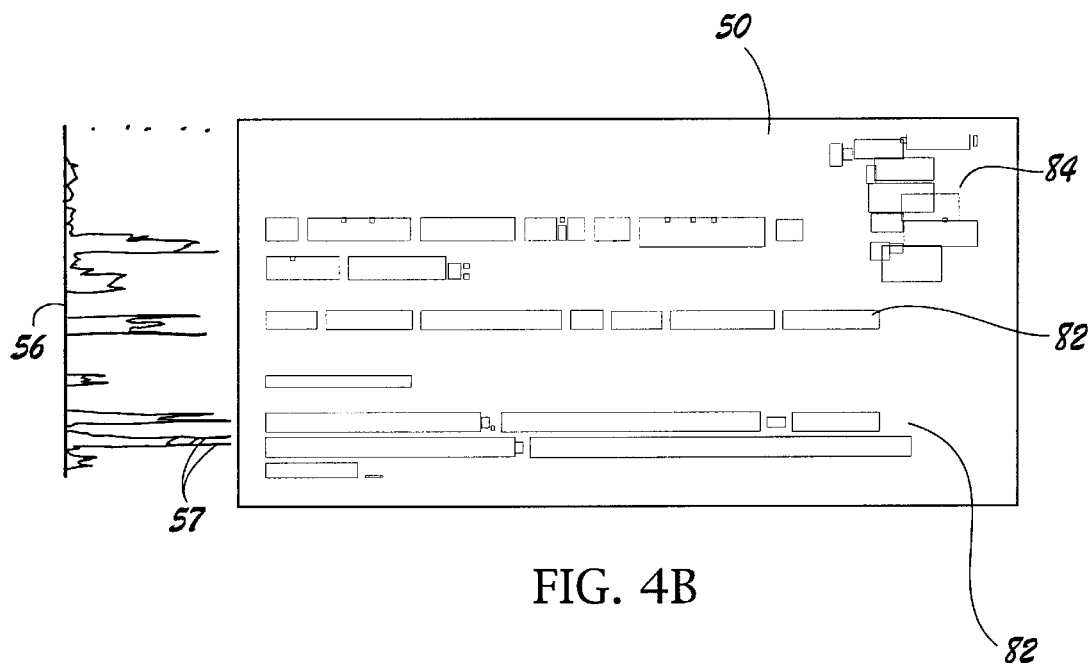

As illustrated in FIG. 4B of the drawings, after line merge, the printed text lines 52 (FIG. 1) form long bounding boxes 82 with uniform height. The regularly patterned merged bounding boxes 82 of the printed text lines correspond with twin peaks 57 in the vertical projection histogram 56 (FIG. 1). However, as shown in FIGS. 4A-B, the bounding boxes of the handwritten annotations 84 generally create connected components that vary greatly in size. Therefore, the bounding boxes of the handwritten annotations 84 are typically unlikely to merge and generally do not correspond with the projection histogram 56.

Figure 5:
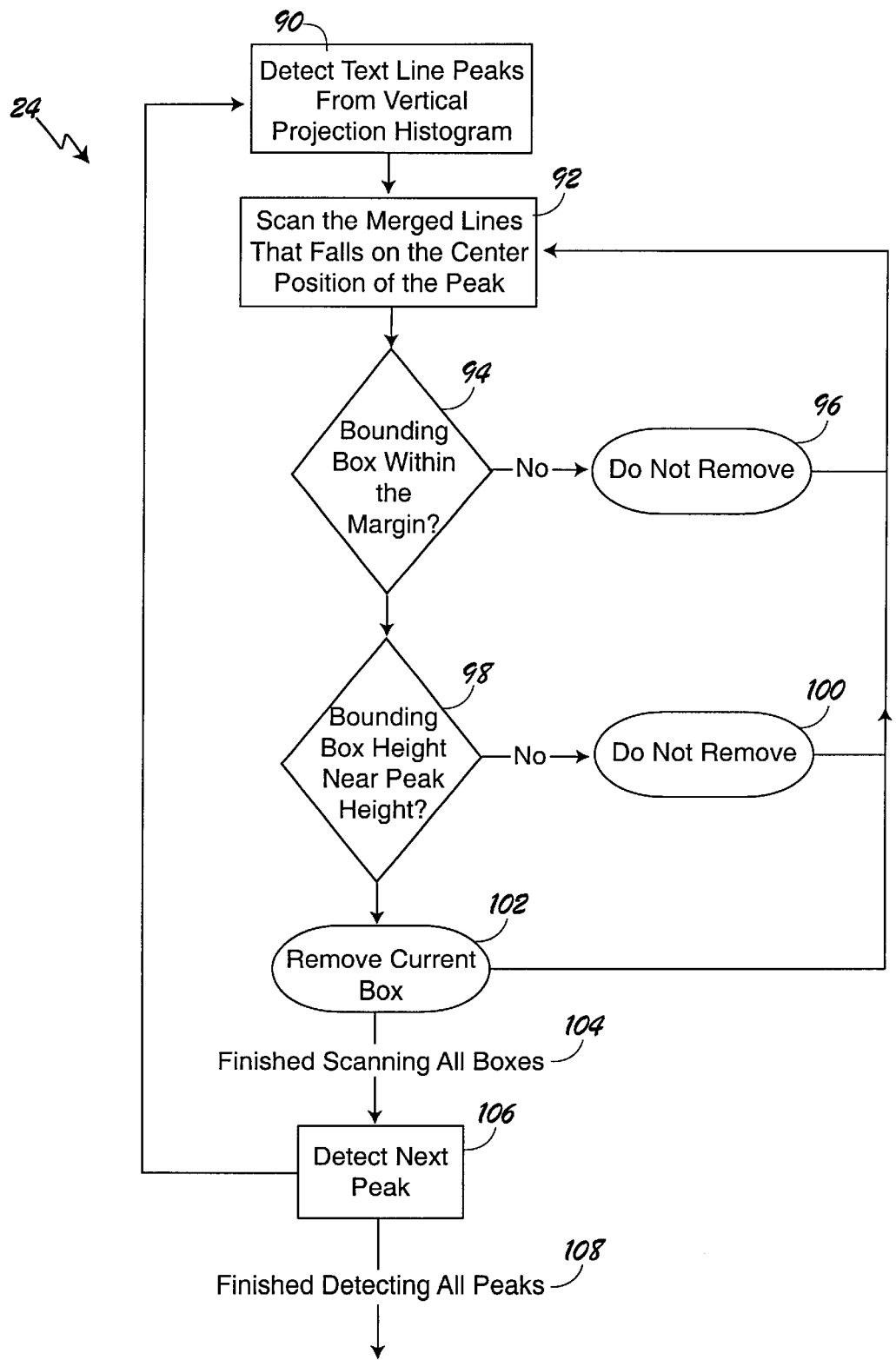
FIG. 5 is a flow chart depicting the steps for legible text line elimination in accordance with the present invention.

With reference to FIGS. 4A-B and 5 of the drawings, the step 24 of eliminating the printed text lines is illustrated in greater detail. After the vertical and horizontal projection histograms 56 and 62 have been generated, the peaks that correspond to each of the merged text line 82 can be characterized as having the twin peaks 57. The twin peaks 57 are similar in height and their distance is within a predetermined range. Each of these twin peaks 57 represents the top and bottom position of each of the printed text lines. The distance between the tips of these two peaks can be used to estimate the height of the printed text line to which it corresponds. The text line peaks from the vertical projection histogram 56 are detected at step 90.

After the text line peaks are detected at step 90, the merged lines 82 and 84 that fall in the center position of the peaks are scanned, step 92. Each of the merged lines 82 and 84 is examined individually to determine whether all of the bounding boxes 72, 74 fall within the margins, step 94. If the bounding boxes 72, 74 do not reside within the margins, the merged lines 82, 84 are not eliminated, step 96, and the next merged line 82, 84 that falls in the center position of the peak is scanned, step 92.

If the bounding boxes 72, 74 satisfy the condition of step 94, they are further examined to determine if their heights are near the peak height, step 98. If the bounding boxes 72, 74 do not have similar height, the scanned merged text lines 82 and 84 are not removed, step 100, and the next merged text line that falls in the center position of peak 57 is scanned at step 92. If the bounding boxes satisfy the condition of step 98, the scanned merged text line is considered as being a printed text line and is removed, step 102. The elimination process 24 then goes back to step 92 and continues to scan the next merged line boxes until all merged text lines 82 and 84 are scanned, step 104.

When all merged line boxes are examined at step 104, the next peak is detected at step 106. The same elimination process is performed on the scanned document image until all peaks are detected and examined at step 108. The elimination process 24 makes certain that only possible main text lines 52 (FIG. 2) are eliminated. To assure that only main text lines are eliminated, the projection histogram peak position and the width are cross-checked with the position and height of the printed text line that is to be eliminated. Only merged text lines 82 and 84 that fall within the margins are considered for removal.

Figure 6:
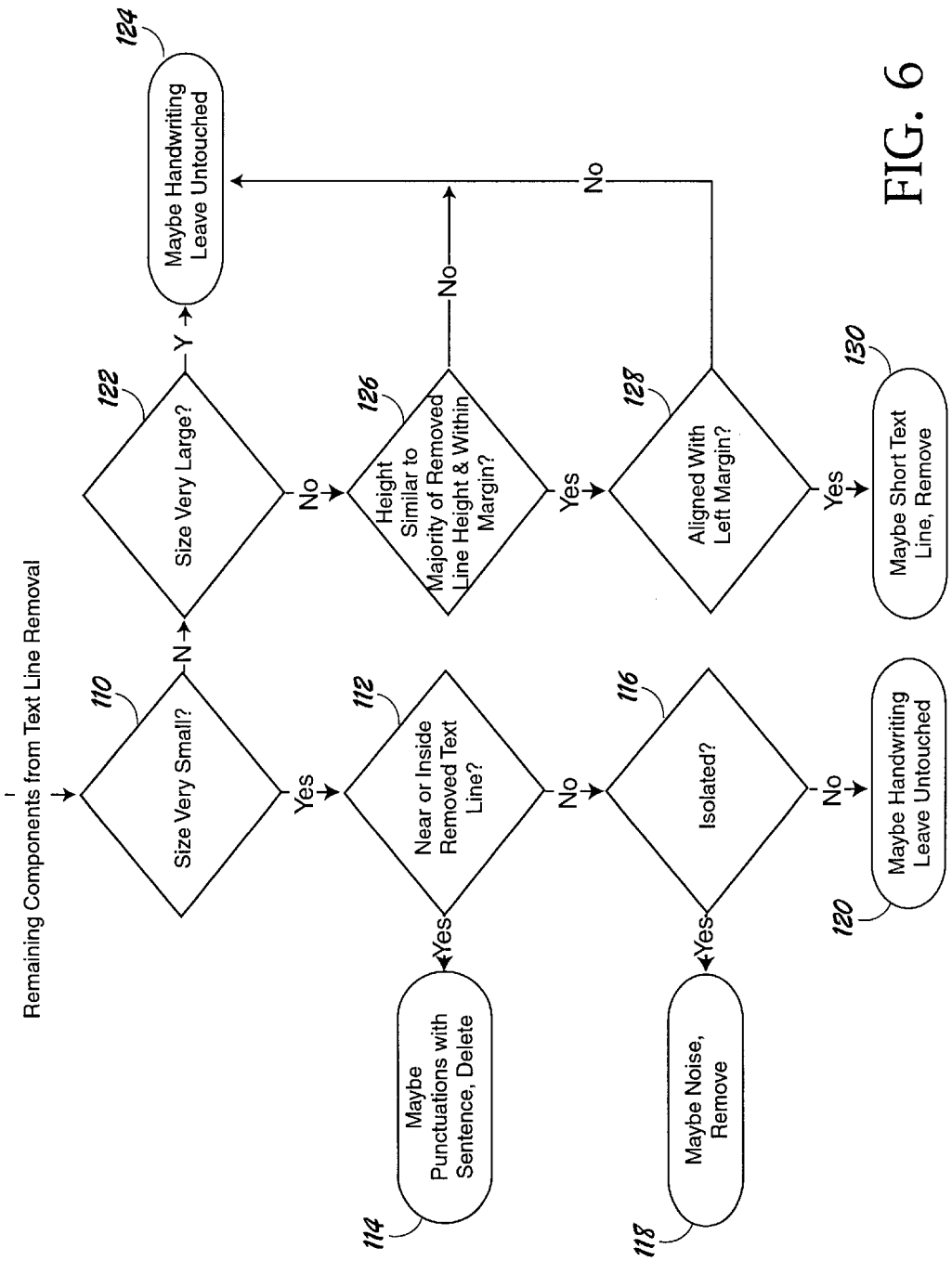
FIG. 6 is a flow chart depicting the steps for further discrimination between the printed text lines and the handwritten annotations of the scanned document image in accordance with the present invention.

Referring to FIG. 6, the step 26 for further discrimination between the printed text lines 52 (FIG. 1) and the handwritten annotations 54 (FIG. 1) is illustrated. After the text line elimination step 24, most of the printed text lines have been removed, except for a few types of bounding boxes of the printed text lines. For example, the bonding boxes of some small connected components within the text line may not have been removed. These small connected components include punctuation or special symbols within the sentence of abnormal bounding box size. The bounding boxes of the printed text lines that are very short have lower probabilities of being detected because their low intensity levels in the projection histograms do not match the regular pattern of the other printed text lines. On the contrary, some small connected components within a block of handwritten annotations may have been removed because they coincidentally fall within the margins of the printed text lines and align with a detected peak.

After the text line elimination step 24 (FIG. 5), the algorithm determines whether the remaining components have sizes that are smaller than a predetermined small size, step 110. If the remaining components have sizes that are smaller than the predetermined small size, then the algorithm determines whether the remaining components reside either near or inside the removed text lines step 112. If the remaining components reside either near or inside the removed text line, then the remaining components are considered punctuation or special symbols within the sentence and are therefore removed, step 114.

If the remaining components do not reside near or inside the removed text line, the algorithm determines whether the remaining components are isolated from the other text, step 116. If the remaining components are isolated, the remaining components are considered noise and are removed, step 118. If the remaining components are not isolated, the remaining components are considered as the handwritten annotations, and left untouched, step 120.

If the remaining components have sizes that are larger than the predetermined small size at step 110, the algorithm determines whether the remaining components have sizes that are larger than a predetermined large size at step 122. If the remaining components have sizes that are larger than the predetermined large size, the remaining components are considered as the handwritten annotations and left untouched, step 124.

If the size of the remaining components are not larger than the predetermined large size, the height of the bounding boxes of the remaining components are compared to the height of the majority of the removed text lines and the margins, step 126. If the height of the remaining components are not similar to the height of the majority of the removed text lines or the bounding boxes of the remaining components do not reside within the margin of the document page, the remaining components are considered to be handwritten annotations and left untouched, step 124.

If the remaining components satisfy the condition of step 126, it is determined whether the remaining components align with the left margin 64 (FIG. 2), step 128. If the remaining components do not align with the left margin, the remaining components are considered to be handwritten annotations and are left untouched, step 124. If the remaining components align with the left margin 64, the remaining components are considered to be short printed text lines having the peak intensity to levels in the vertical projection histogram that are too low to be detected, and are removed, step 130.

At the further text removal step 130, every component deleted from the text line removal is further examined in order to determine if any connected components that may belong to the handwritten annotations have been removed. In the present invention, the bounding boxes that are surrounded by a group of irregular shapes which are considered handwritten annotations even if these bounding boxes satisfy all of the above-mentioned conditions. These bounding boxes surrounded by a group of irregular shapes are then restored at the end of step 26 (FIG. 1).

Figure 7:
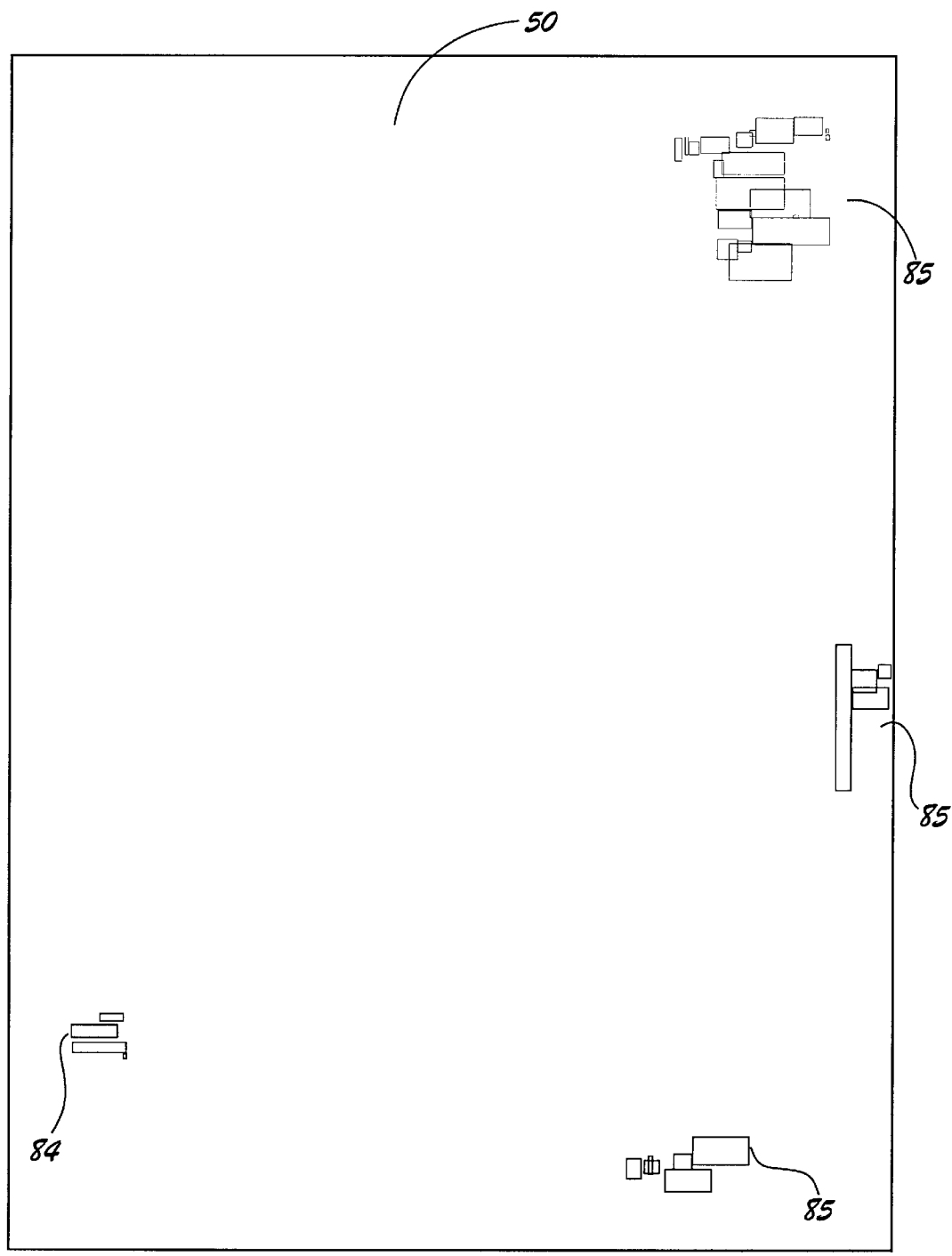
FIG. 7 illustrates the bounding boxes of the handwritten annotations being detected and separated from the scanned document image of FIG. 2.
Figure 8:
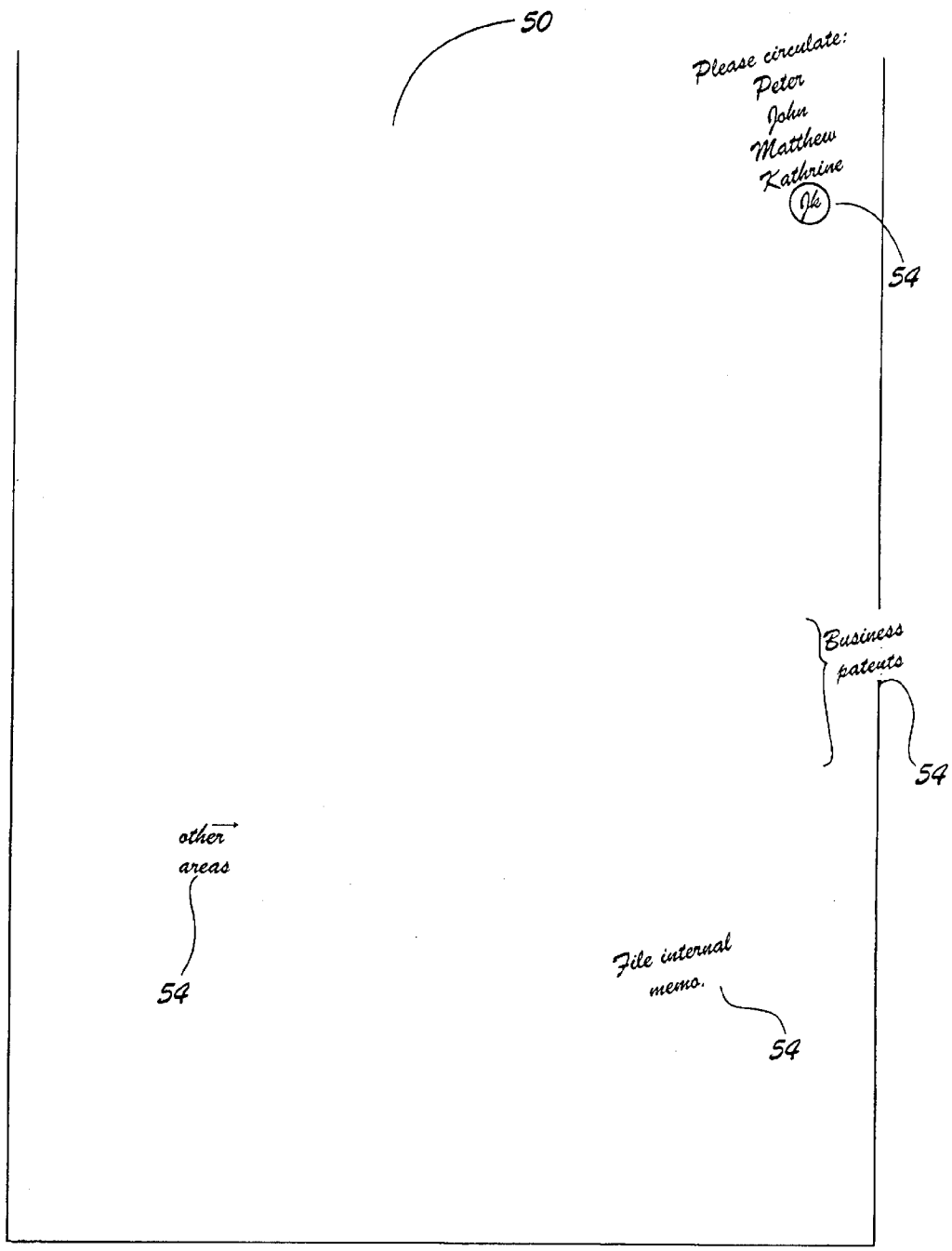
FIG. 8 illustrates the extracted handwritten annotations obtained from the scanned document image of FIG. 2.

Referring to FIGS. 7 and 8 of the drawings, the results of the handwriting detection and separation from the scanned document image 50 (FIG. 2) are illustrated. After the separation step 28 (FIG. 1), the handwritten annotations are left as the line merged bounding box 85, and printed text lines may either be discarded or saved into a memory. The handwritten annotations 54 are then extracted which may then be either discarded or saved into a memory for future use.

Figure 9:
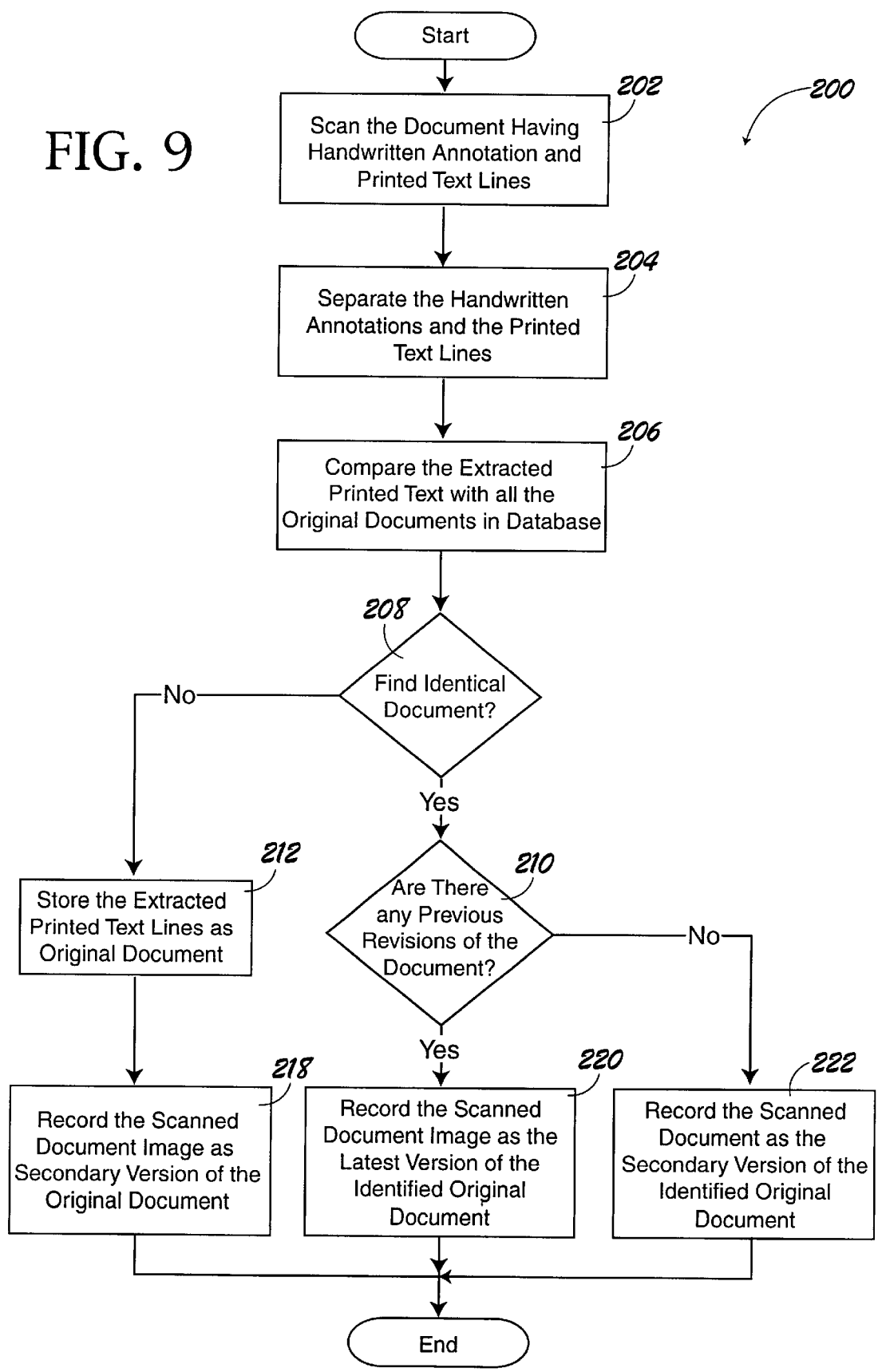
FIG. 9 illustrates how the invention may be applied to a method for recording a history of a document having at least one secondary version in accordance with the present invention.

FIG. 9 illustrates a first embodiment of how the invention may be applied to a method 200 for recording a history of a document. The document may have one and more versions: at least an original version ($1^{st}$ version) and maybe revisions (secondary version). The original version includes only printed text lines whereas the secondary version includes the printed text lines and secondary handwritten annotations. When a paper document is scanned, the original version (printed text lines) may or may not exist in the document database electronically.

Starting at step 202, a document with mixed handwritten annotation and printed text lines is scanned. The handwritten annotations of the scanned document image are discriminated from the printed text lines according to the aforementioned method for detecting and separating handwritten annotations from the scanned document image, step 204. The extracted printed text lines are compared to all the original documents in the database at step 206 in order to determine if an original version exists in the database, step 208. In step 206, if there exists an original document in the database that is identical to the extracted printed text lines, this document is identified to be the original version of the scanned document image. Several publications disclose the methods for identifying two same documents namely duplicate document detection. In "Duplicate document detection" in Proceedings of Document Recognition IV (IS&T/SPIE Electronic Imaging), pages 88–94, February, 1997, Spitz employs character shape codes as features and compares them using a standard string matching algorithm. In "The detection of duplicates in document image databases" in Proceedings of the Fourth International Conference on Document Analysis and Recognition, pages 314–318, August 1997, Doermann et al., use shape codes to address the duplicate document detection problem from full-layout aspect.

If no original document is found to be identical to the extracted printed text lines, the separated printed text lines will be stored as the original document, step 212. The scanned document image having handwritten annotation and printed text lines will be recorded as the second version of the original document, step 218. The process is terminated. If the separated printed text lines are related to one original document at step 208, it is further determined whether there is any revisions (secondary version) of the original document, step 210. In case of the identified original document having no other secondary versions, the scanned image is stored as a secondary version, step 222. The process is terminated. When the identified original document has at least one revision, the scanned image is stored as the most recent version, step 220. The process is terminated. The above described application has a particular use, but not limited to, for recording a history of a document when the document is revised by a group of people at different locations and times.

Figure 10:
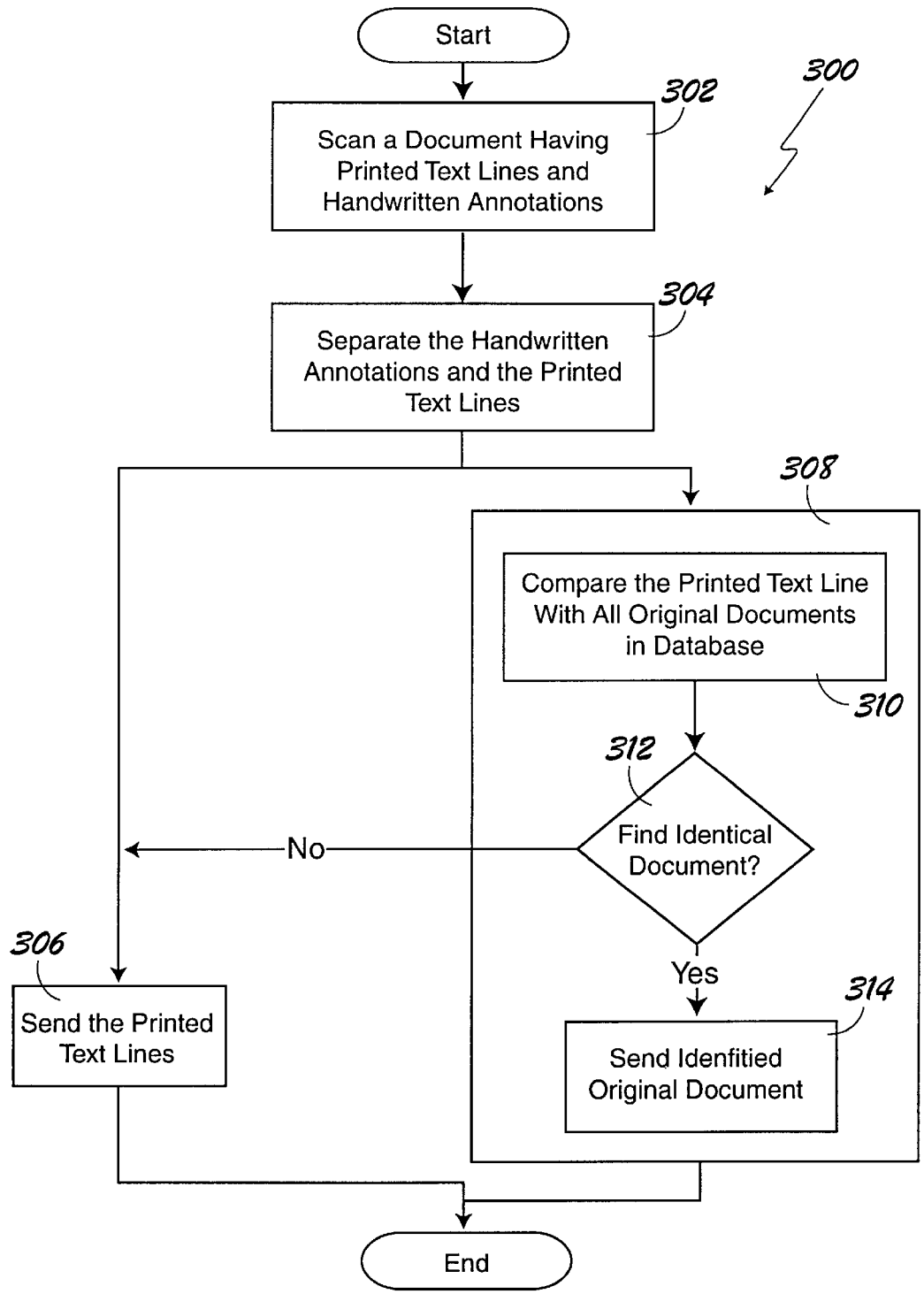
FIG. 10 illustrates how the invention may be applied to a method for securing transmission of a document having printed text lines and add-on information in accordance with the present invention.

FIG. 10 illustrates a second embodiment 300 of how the invention may be applied to a method for securing transmission of an original version of a document. The document has two versions, namely, the original version and at least one secondary version. The original version includes printed text lines whereas the secondary version includes handwritten annotations in addition to the printed text lines.

Starting at step 302, the secondary document having the printed text lines and the handwritten annotations is scanned. The handwritten annotations are then separated from the printed text lines according to the aforementioned method for detecting and separating the add-on information 10 (FIG. 1), step 304. After the separation, there are two methods of sending a secured document. The first method, step 306, sends the extracted printed text lines only to avoid add-on handwritten annotations being transmitted.

Optionally, a second method can be used to transmit the original version of the document if it exists, step 308. In step 308, the extracted printed text line is compared to all the original documents in the database, step 310. If the original document is identified from the database, step 312, this identified original document will be sent instead, step 314. If no original document is identified, the extracted printed text lines will be sent, step 306. Sometimes, various versions of the same original document are to be sent at different times, and slight difference in handwriting separation results may yield different extracted printed text lines at each time. When step 308 is applied, the same original version is sent to the recipient at every time. The above described application has a particular use, but not limited to, for securing transmission of documents having handwritten confidential information.

Figure 11:
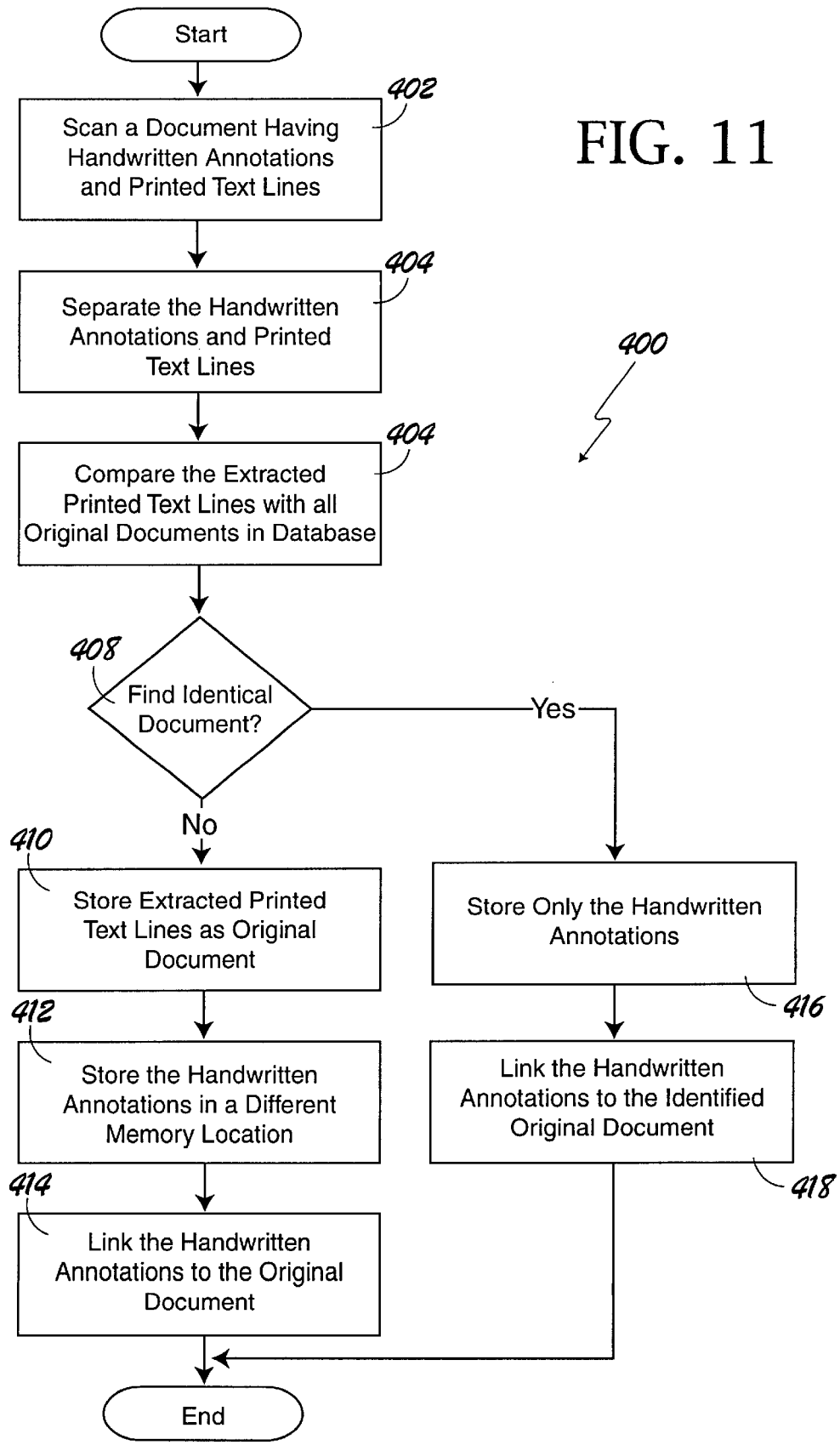
FIG. 11 illustrates how the invention may be applied to an efficient compression method in accordance with the teachings of the present invention.

FIG. 11 illustrates a third embodiment of how the invention is applied to a compression method, step 400. The document includes an original version having printed text lines that is stored in a database. The document may further include a secondary version having handwritten annotations in addition to the printed text lines.

Starting at step 402, the secondary version of the document having the printed text lines and the handwritten annotations is scanned. The handwritten annotations are separated from the printed text lines according to the aforementioned method for detecting and separating the add-on information 10 (FIG. 1), step 404. The separated printed text lines are then compared to all the original documents in the database at step 406 in order to find the identical document, step 408. If there does not exist an original document for the printed text lines, the extracted printed text line is stored as original document, step 410, and handwritten annotations is stored in a different memory location, step 412. The memory location of the stored handwritten annotation is linked to the memory location of the original document, step 414. The process is terminated. In case of extracted printed text lines having an original document in the database, only handwritten annotations are stored, step 416, and therefore linked to the identified original document, step 418. The process is terminated. In this case, the extracted printed text lines are ignored, and memory space is saved.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method far detecting handwritten annotations from a scanned document image, the scanned document image having a handwritten annotation and at least one printed text line, the method comprising the steps of:
   generating at least one projection histogram for the scanned document image, wherein the projection histogram includes a regular pattern that correlates to the printed text lines;
   applying connected component analysis to the scanned document image in order to generate at least one merged text line, wherein each of the merged text lines correlate to at least one of the handwritten annotations and the printed text lines; and
   discriminating the printed text lines from the handwritten annotations by comparing the merged text lines to the regular pattern of the projection histograms.

2. The method of claim 1, wherein the projection histogram is selected from the group consisting of a vertical projection histogram, a horizontal projection histogram and the combinations thereof.

3. A method for detecting handwritten annotations from a scanned document image, the scanned document image having a handwritten annotation and at least one printed text line, the method comprising the steps of:
   generating at least one projection histogram for the scanned document image, wherein the projection histogram includes a regular pattern that correlates to the printed text lines;
   applying connected component analysis to the scanned document image in order to generate at least one merged text line, wherein each of the merged text lines correlate to at least one of the handwritten annotations and the printed text lines; and
   discriminating the printed text lines from the handwritten annotations by comparing the merged text lines to the regular pattern of the projection histograms; wherein the regular pattern is margins of the printed text lines.

4. A method for detecting handwritten annotations from a scanned document image, the scanned document image having a handwritten annotation and at least one printed text line, the method comprising the steps of:
   generating at least one projection histogram for the scanned document image, wherein the projection histogram includes a regular pattern that correlates to the printed text lines;
   applying connected component analysis to the scanned document image in order to generate at least one merged text line, wherein each of the merged text lines correlate to at least one of the handwritten annotations and the printed text lines;
   comparing the merged text lines to the regular pattern of the projection histograms, thereby discriminating the printed text lines from the handwritten annotations; and
   detecting text line peaks from the projection histogram of the scanned document image.

5. A method for detecting handwritten annotations from a scanned document image, the scanned document image having a handwritten annotation and at least one printed text line, the method comprising the steps of:
   generating at least one projection histogram for the scanned document image, wherein the projection histogram includes a regular pattern that correlates to the printed text lines;
   applying connected component analysis to the scanned document image in order to generate at least one merged text line, wherein each of the merged text lines correlate to at least one of the handwritten annotations and the printed text lines; and
   comparing the merged text lines to the regular pattern of the projection histograms, thereby discriminating the printed text lines from the handwritten annotations;
   wherein the step of applying connected component analysis further comprising steps of:
   generating connected components onto the scanned document image by connecting dark pixels that are in relation to each other;
   generating bounding boxes of the connected components; and
   line merging the bounding boxes that are within a same text line in order to generate the merged text line.

6. The method of claim 5, wherein the step of line merging is recursively performed until there is no bounding box on the same text line to line merge.

7. The method of claim 5, wherein the step of line merging merges two of the bounding boxes if one bounding box is completely inside the other bounding box.

8. The method of claim 5, wherein the step of line merging merges two of the bounding boxes if two bounding boxes are neighbors and on a same line.

9. A method for detecting handwritten annotations from a scanned document image, the scanned document image having a handwritten annotation and at least one printed text line, the method comprising the steps of:
- generating at least one projection histogram for the scanned document image, wherein the projection histogram includes a regular pattern that correlates to the printed text lines;
- applying connected component analysis to the scanned document image in order to generate at least one merged text line, wherein each of the merged text lines correlate to at least one of the handwritten annotations and the printed text lines;
- comparing the merged text lines to the regular pattern of the projection histograms, thereby discriminating the printed text lines from the handwritten annotations; and
- separating the printed text lines and the handwritten annotations by comparing the size of the bounding box to the size of the printed text lines.

10. A method for detecting handwritten annotations from a scanned document image, the scanned document image having a handwritten annotation and at least one primed text line, the method comprising the steps of:
- generating vertical and horizontal projection histograms for the scanned document image, wherein the projection histogram includes margins that correlate to the printed text lines;
- generating connected components by connecting dark pixels that are in association with the others on the scanned document image;
- generating bounding boxes that encapsulates all of the connected components that are in relation with each other;
- line merging the bounding boxes that are within a same text line in order to generate at least one merged text line, wherein each of the merged text lines correlates to at least one of the handwritten annotations and the printed text lines;
- detecting text line peaks from the horizontal projection histogram of the scanned document image; and
- comparing the merged text lines to the margins determined from the vertical and horizontal projection histograms, thereby discriminating the printed text lines from the handwritten annotation.

11. A method for recording a history of a document comprising the steps of;
- scanning a document having printed text lines and handwritten annotations;
- separating the handwritten annotations from the printed text lines of the scanned document; wherein the step of separating further comprises:
  - generating at least one projection histogram for the scanned document, wherein the projection histogram includes a regular pattern that correlates to the printed text lines;
  - applying connected component analysis to the scanned document in order to generate at least one merged text line, wherein each merged text line relates to at least one of the handwritten annotations and the printed text lines; and
  - comparing the merged text lines to the regular pattern of the projection histograms, thereby discriminating the printed text lines from the handwritten annotations;
- comparing the scanned document with an original document wherein the original document includes only the printed text lines;
- determining an existence of previous versions of the scanned document; and
- recording a history of the scanned document based on the separated handwritten annotations.

12. The method of claim 11 wherein the step of applying connected component analysis further comprising steps of:
- generating connected components by connecting dark pixels that are in relation to each other on the scanned document image;
- generating bounding boxes of the connected components; and
- line merging the bounding boxes that are within a same text line in order to generated the merged text line.

13. The method of claim 11 further comprising the steps of:
- detecting the existence of the original document;
- storing the punted text lines as the original document when the printed text lines of the scanned document are different from the detected original document; and
- recording the scanned document as a second version of the original document.

14. The method of claim 11, wherein the step of recording the history of the document further comprising the steps of:
- recording the scanned document as a second version of the original document if no previous version of the original document is detected; and
- recording the scanned document as a latest version of the original document if at least one previous version is detected.

15. A method for securing transmission of an original version of a document, the document having the original version and at least one secondary version, wherein the original version includes only printed text lines and the secondary version includes the printed text lines and handwritten annotations, the method comprising the steps of:
- separating the printed text lines train the handwritten annotations in at least one secondary version of the document by using a histogram to identify regions containing handwritten annotations;
- wherein said separating step further comprising the steps of:
  - generating vertical and horizontal projection histograms for the scanned document image, wherein the projection histogram includes margins that correlate to the printed text lines;
  - generating connected components by connecting clark pixels that are in association with the others on the scanned document image;
  - generating bounding boxes that encapsulates all of the connected components that are in relation with each other;
  - line merging the bounding boxes that are within a same text line in order to generate at least one merged text line, wherein each of the merged text lines correlates to at least one of the handwritten annotations and the printed text lines;
  - detecting text line peaks from the horizontal projection histogram of the scanned document image; and discriminating the printed text lines from the handwritten annotations by comparing the merged text lines to the regular pattern of the projection histograms;

determining the original version of the document in relation with the printed text lines separated from the handwritten annotations; and transmitting the printed text lines after the step of determining the original version of the document.

16. The method of claim 15 wherein the step of transmitting the document further comprises transmitting the original version when the printed text lines are identical to the original version of the document; and transmitting the printed text lines when the printed text lines are different from the original version of the document.

17. An efficient compression method wherein an original version of a document is stored in a database, the document having at least one secondary version which includes printed text lines and handwritten annotations, the method comprising the steps of:

separating the printed text lines from the handwritten annotations in at least one secondary version of the document by using a histogram to identify regions containing handwritten annotations, wherein said step further comprising of the steps of;

generating vertical and horizontal projection histograms for the scanned document image, wherein the projection histogram includes margins that correlate to the printed text lines;

generating connected components by connecting dark pixels that are in association with the others on the scanned document image;

generating bounding boxes that encapsulates all of the connected components that are in relation with each other;

line merging the bounding boxes that are within a same text line in order to generate at least one merged text line, wherein each of the merged text lines correlates to at least one of the handwritten annotations and the printed text lines;

detecting text line peaks from the horizontal projection histogram of the scanned document image; and comparing the merged text lines to the margins determined from the vertical and horizontal projection histograms, thereby discriminating the printed text lines from the handwritten annotations;

comparing the printed text lines with the original documents; and storing only the handwritten annotations in association with the original document.

* * * * *

UNITED STATES PATENT AND TRADEMARK OFFICE
CERTIFICATE OF CORRECTION

PATENT NO. : 6,909,805 B2
DATED : June 21, 2005
INVENTOR(S) : Yue Ma

It is certified that error appears in the above-identified patent and that said Letters Patent is hereby corrected as shown below:

Title page,
Item [56], References Cited, U.S. PATENT DOCUMENTS, add:
-- 4,910,787    03/1990        Umeda, et al.
   5,570,435    10/1996        Bloomberg, et al.
   5,680,478    10/1997        Wang, et al. --.
FOREIGN PATENT DOCUMENTS, add:
-- 490687A2    06/1992        Europe
   202671A2    11/1986        Europe --.
OTHER PUBLICATIONS, add:
-- Violante, S., Smith R. and Reiss, "M.: A Computationally Efficient Technique for Discriminating Between Hand-written and Printed Text," IEEE Colloquium on Document Image Processing and Multimedia Environments, pages 17/1-17/7, 1995.
Pal, U. and Chaudhuri, "B.B.: Automatic Separation of Machine-printed and Hand-written Text Lines, Proceedings of $5^{th}$ ICDAR, pages 645-648, 1999.
Doermann, D., H. Li and O. Kia, "The Detection of duplicates in document image databases", In Proceedings of the Fourth International Conference on Document Analysis and Recongnition, page 314-318, August 1997.
Spitz, Larry, "In Proceedings of Document Recognition IV," IS&T/SPIE Electronic Imaging, pages 88-94, February 1997.
O. Iwaki, H. Kida, H. Arakawa, "A Segmentation Method Based On Office Document Hierarchical Structure", Proceedings of the International Conference on Systems, Man, and Cybernetics. Alexandria, VA, Oct. 20-23, 1987, New York, IEEE.
W. Horak, "Layering Approach Manages Mixed Documents" Electronic Design, Penton Publishing, Cleveland, Ohio, April 15, 1982, pps. 49-52. --.

Column 11,
Line 28, "primed" should be -- printed --.

Column 12,
Line 26, "punted" should be -- printed --.
Line 45, "train" should be -- from --.

UNITED STATES PATENT AND TRADEMARK OFFICE
CERTIFICATE OF CORRECTION

PATENT NO. : 6,909,805 B2
DATED : June 21, 2005
INVENTOR(S) : Yue Ma

It is certified that error appears in the above-identified patent and that said Letters Patent is hereby corrected as shown below:

Column 12 (cont'd),
Line 55, "clark" should be -- dark --.

Signed and Sealed this

Twentieth Day of December, 2005

JON W. DUDAS
*Director of the United States Patent and Trademark Office*